United States Patent
Foskey

(10) Patent No.: US 11,498,672 B2
(45) Date of Patent: Nov. 15, 2022

(54) STOWED BLADE ACTIVE RESTRAINT

(71) Applicant: Bell Textron Inc., Fort Worth, TX (US)

(72) Inventor: Christopher Edward Foskey, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 207 days.

(21) Appl. No.: 16/585,975

(22) Filed: Sep. 27, 2019

(65) Prior Publication Data

US 2021/0094683 A1 Apr. 1, 2021

(51) Int. Cl.
  *B64C 27/50* (2006.01)
  *B64C 29/00* (2006.01)
  *B64D 29/02* (2006.01)

(52) U.S. Cl.
  CPC .......... *B64C 27/50* (2013.01); *B64C 29/0033* (2013.01); *B64D 29/02* (2013.01)

(58) Field of Classification Search
  CPC ..... B64C 27/50; B64C 29/0033; B64C 11/28; B64C 27/022; B64D 29/02
  See application file for complete search history.

(56) References Cited

U.S. PATENT DOCUMENTS

| | | | | |
|---|---|---|---|---|
| 4,301,982 A | * | 11/1981 | Tiemann | B64C 27/50 244/17.11 |
| 9,957,042 B1 | * | 5/2018 | Vander Lind | B64C 11/28 |
| 2015/0225077 A1 | * | 8/2015 | Dunmire | B64C 27/32 248/316.5 |
| 2016/0152329 A1 | * | 6/2016 | Tzeng | B64C 29/0033 416/134 R |
| 2019/0106197 A1 | * | 4/2019 | Foskey | B64C 29/0033 |
| 2019/0277353 A1 | * | 9/2019 | Przybyla | B64C 27/28 |

\* cited by examiner

*Primary Examiner* — Philip J Bonzell
*Assistant Examiner* — Ashesh Dangol
(74) *Attorney, Agent, or Firm* — Shackelford, Bowen, McKinley & Norton, LLP

(57) ABSTRACT

An exemplary clamp system for securing a proprotor blade in a stowed position includes a clamp having a pair of opposing pads operable between an open position to receive a portion of a proprotor blade between the pair of opposing pads and a closed position to grip the portion of the proprotor blade with the pair of opposing pads and a rotary actuator in connection with the clamp to operate the clamp between the open and the closed position.

20 Claims, 8 Drawing Sheets

STOWED BLADE ACTIVE RESTRAINT

TECHNICAL FIELD

This disclosure relates in general to the field of aircraft, and more particularly, to tiltrotor aircraft operable for vertical takeoff and landing in a helicopter mode and high-speed forward cruising in an airplane flight mode and, in particular, to tiltrotor aircraft operable for transitions between rotary and non-rotary flight modes.

BACKGROUND

This section provides background information to facilitate a better understanding of the various aspects of the disclosure. It should be understood that the statements in this section of this document are to be read in this light, and not as admissions of prior art.

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of tiltrotor aircraft in forward flight.

SUMMARY

An exemplary clamp system for securing a proprotor blade in a stowed position includes a clamp having a pair of opposing pads operable between an open position to receive a portion of a proprotor blade between the pair of opposing pads and a closed position to grip the portion of the proprotor blade with the pair of opposing pads and a rotary actuator in connection with the clamp to operate the clamp between the open and the closed position.

An exemplary aircraft includes a pylon rotatable relative to a wing, the pylon having a fairing with a cut-out, a proprotor assembly carried by the pylon and having a proprotor blade that is foldable to a stowed position during non-rotary flight, a clamp positioned with the pylon at the cut-out and including a pair of opposing pads operable between an open position to receive a portion of the proprotor blade between the pair of opposing pads and a closed position to grip the portion of the proprotor blade with the pair of opposing pads and a rotary actuator in connection with the clamp to operate the clamp between the open and the closed position.

An exemplary method includes flying a tiltrotor aircraft in a rotary flight mode, transitioning the tiltrotor aircraft from the rotary flight mode to a non-rotary flight mode, actuating via a rotary actuator a clamp positioned at a cut-out in a pylon fairing to an open position separating a pair of opposing pads, folding, during the non-rotary flight mode, a proprotor blade and positioning a portion of the proprotor blade between the pair of opposing pads and actuating the opposing pads to a closed position gripping the portion of the proprotor blade between the pair of opposing pads.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
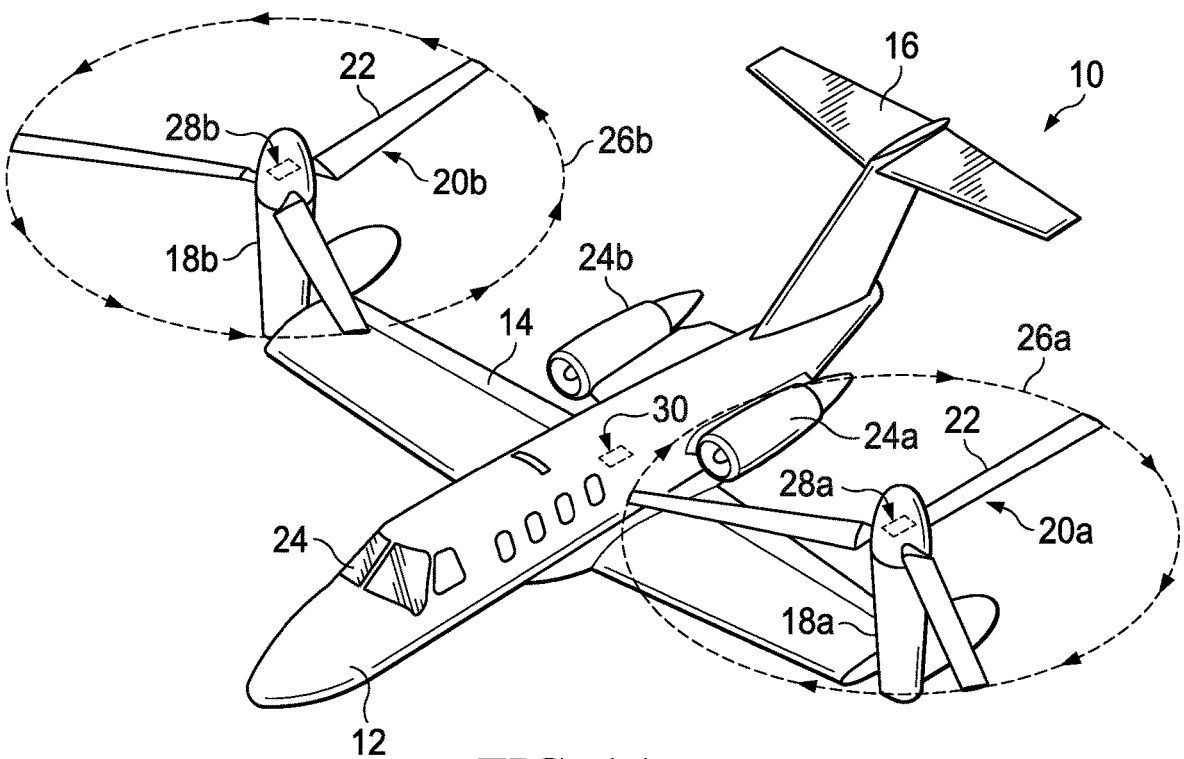
FIGS. 1A-1D are schematic illustrations of an exemplary tiltrotor aircraft in various flight modes in accordance with aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting.

For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Figure 1B:
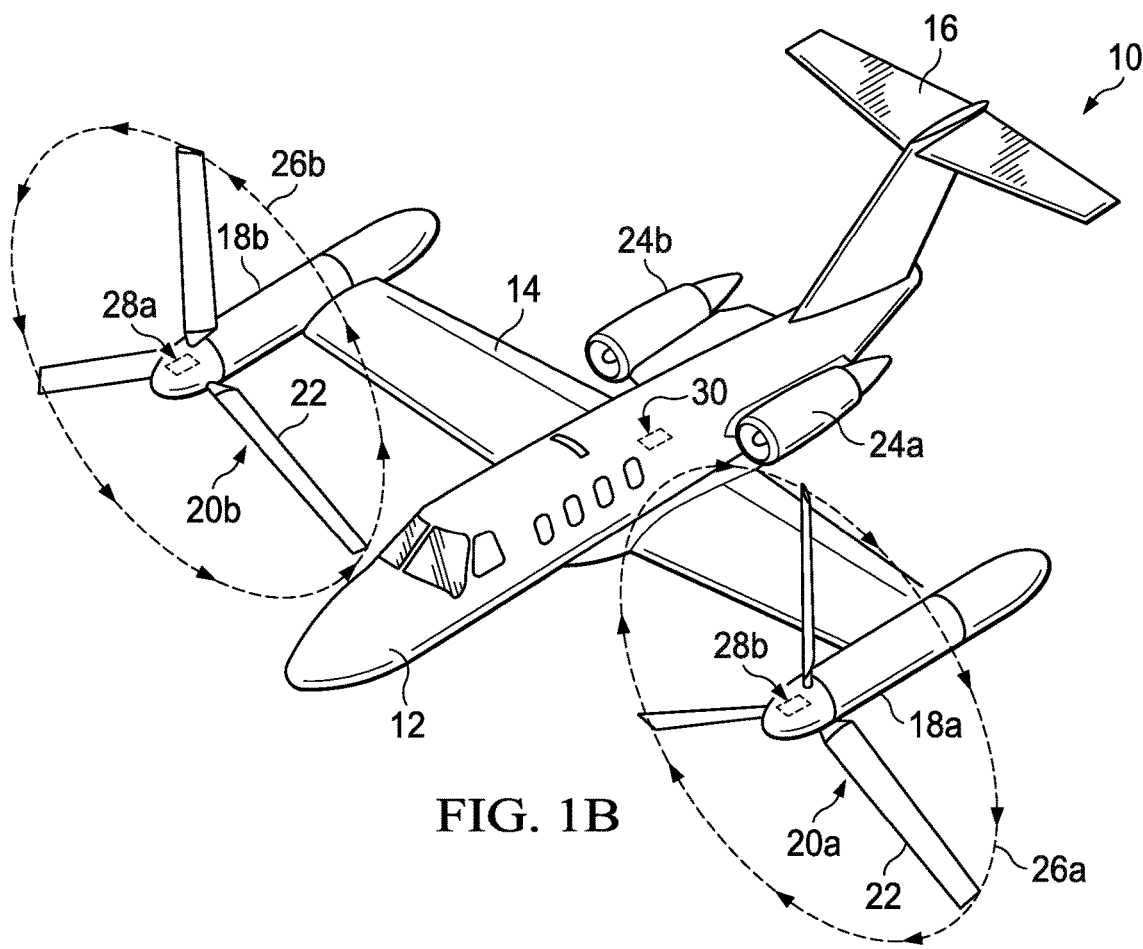
Figure 1C:
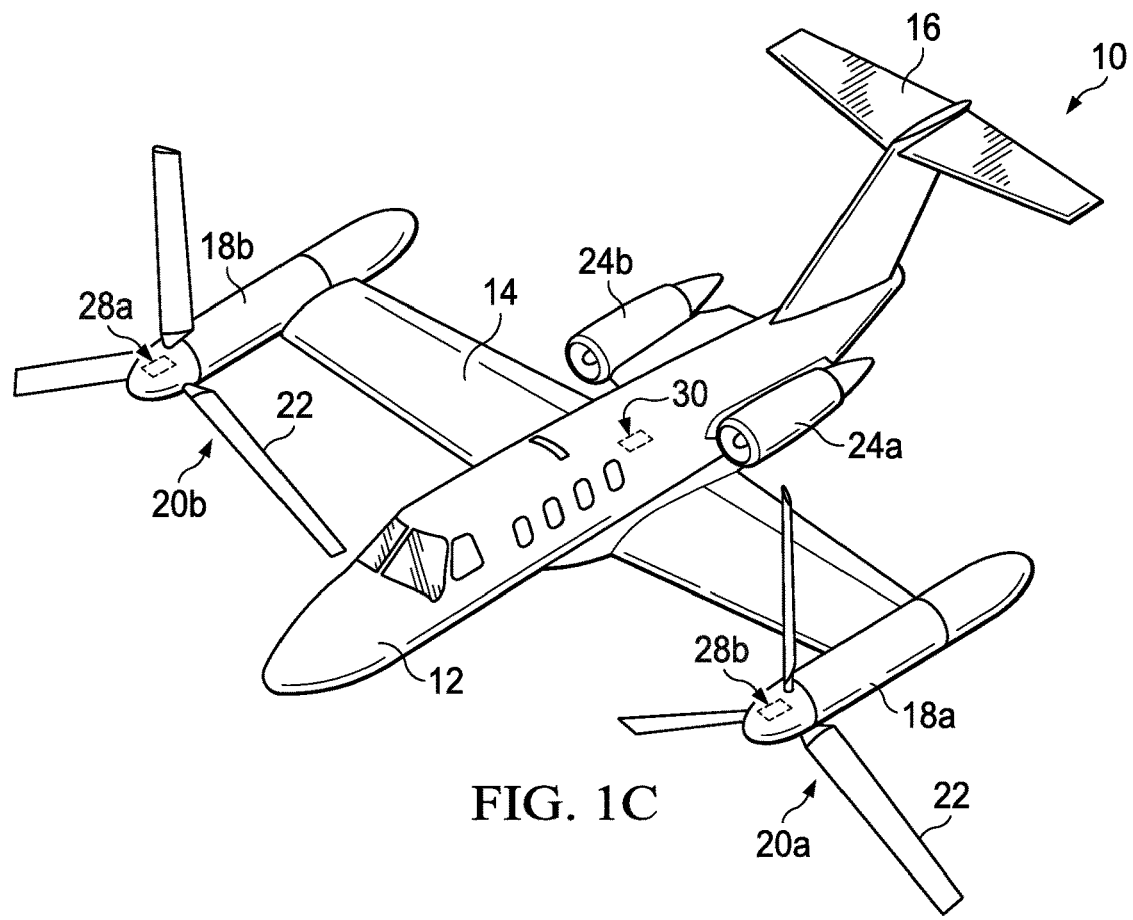
Figure 1D:
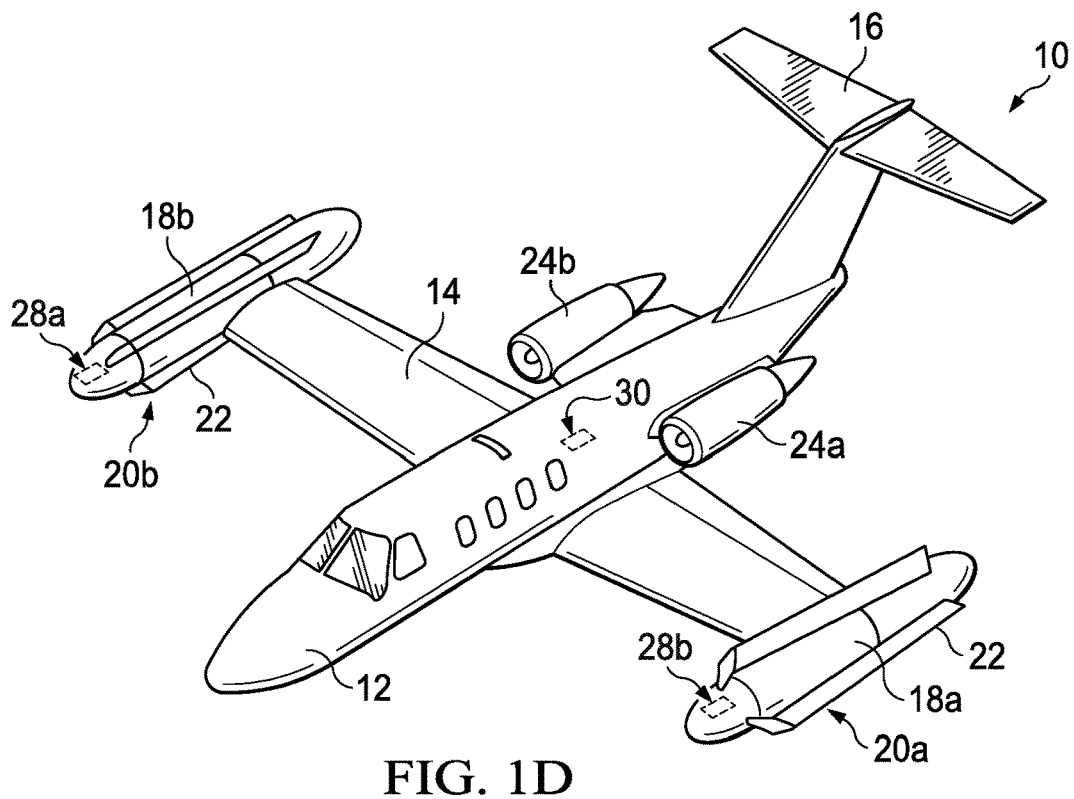

Referring to FIGS. 1A-1D in the drawings, a tiltrotor aircraft is schematically illustrated and generally designated 10. Aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. Each proprotor assembly 20a, 20b includes a plurality of proprotor blades 22 that are operable to be rotated, as best seen in FIGS. 1A-1B, operable to be feathered, as best seen in FIG. 1C and operable to be folded, as best seen in FIG. 1D. In the illustrated embodiment, proprotor assembly 20a is rotated responsive to torque and rotational energy provided by engine 24a and proprotor assembly 20b is rotated responsive to torque and rotational energy provided by engine 24b. Engines 24a, 24b are located proximate an aft portion of fuselage 12. Engines 24a, 24b are operable in a turboshaft mode, as best seen in FIGS. 1A-1B and a turbofan mode, as best seen in FIGS. 1C-1D.

FIG. 1A illustrates aircraft 10 in VTOL or helicopter flight mode, in which proprotor assemblies 20a, 20b are rotating in a substantially horizontal plane to provide a lifting thrust, such that aircraft 10 flies much like a conventional helicopter. In this configuration, engines 24a, 24b are operable in turboshaft mode wherein hot combustion gases in each engine 24a, 24b cause rotation of a power turbine coupled to an output shaft that is used to power the drive system coupled to the respective proprotor assemblies 20a, 20b. Thus, in this configuration, aircraft 10 is considered to be in a rotary flight mode. FIG. 1B illustrates aircraft 10 in proprotor forward flight mode, in which proprotor assemblies 20a, 20b are rotating in a substantially vertical plane to provide a forward thrust enabling wing 14 to provide a lifting force responsive to forward airspeed, such that aircraft 10 flies much like a conventional propeller driven aircraft. In this configuration, engines 24a, 24b are operable in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 26a, and proprotor assembly 20b rotates counterclockwise, as indicated by motion arrows 26b. In the illustrated embodiment, proprotor assemblies 20a, 20b each include three proprotor blades 22 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

A flight control computer 30 is schematically shown in fuselage 12, but it should be appreciated that flight control computer 30 may take a number of forms and exist in a variety of locations within aircraft 10. Similarly, although flight control computer 30 is illustrated singly, flight control computer 30 can be illustrative of two, three, four or any other suitable number of flight control computers in aircraft 10, which computers can be located in same, similar or different locations within fuselage 12 or elsewhere in aircraft 10.

Flight control computer 30 is configured to control and communicate with various systems within aircraft 10 including, for example, local control systems 28a and 28b. Local control systems 28a and 28b are schematically shown in the proprotor assemblies 20a and 20b, respectively. The local control systems 28a and 28b can each be communicably coupled to the flight control computer 30 and provide closed-loop control of controllable elements located within the proprotor assemblies 20a and 20b. The controllable elements within the proprotor assemblies 20a and 20b can include any structural feature operable to move and/or effect change such as, for example, blade locks, a gimbal lock, trailing-edge flaps, twistable blades, independently controllable elements attached or connected to blades, combinations of the foregoing and/or the like.

The local control systems 28a and 28b can include, inter alia, actuators that control motion of the controllable elements in the proprotor assemblies 20a and 20b, sensors that provide feedback data related to the controllable elements and control computers that operate the actuators, for example, by transmitting control signals to the actuators. Flight control computer 30 and the local control systems 28a and 28b can collaboratively provide a variety of redundant control methods relative to the controllable elements in the proprotor assemblies 20a and 20b.

FIG. 1C illustrates aircraft 10 in transition between proprotor forward flight mode and airplane forward flight mode, in which engines 24a, 24b have been disengaged from proprotor assemblies 20a, 20b and proprotor blades 22 of proprotor assemblies 20a, 20b have been feathered, or oriented to be streamlined in the direction of flight, such that proprotor blades 22 act as brakes to aerodynamically stop the rotation of proprotor assemblies 20a, 20b. In this configuration, engines 24a, 24b are operable in turbofan mode wherein hot combustion gases in each engine 24a, 24b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. Thus, in this configuration, aircraft 10 is considered to be in a non-rotary flight mode. FIG. 1D illustrates aircraft 10 in airplane forward flight mode, in which proprotor blades 22 of proprotor assemblies 20a, 20b have been folded to be oriented substantially parallel to respective pylon assemblies 18a, 18b to minimize the drag force generated by proprotor blades 22. In this configuration, engines 24a, 24b are operable in the turbofan mode and aircraft 10 is considered to be in the non-rotary flight mode. The forward cruising speed of aircraft 10 can be significantly higher in airplane forward flight mode versus proprotor forward flight mode as the forward airspeed induced proprotor aeroelastic instability is overcome.

Even though aircraft 10 has been described as having two engines fixed to the fuselage each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even though proprotor assemblies 20a, 20b are illustrated in the context of tiltrotor aircraft 10, it should be understood by those having ordinary skill in the art that the proprotor assemblies disclosed herein can be implemented on other tiltrotor aircraft including, for example, quad tiltrotor aircraft having an additional wing member aft of wing 14, unmanned tiltrotor aircraft or other tiltrotor aircraft configurations.

Referring additionally to FIGS. 2-7, tiltrotor aircraft 10 includes active clamps 34 incorporated into pylon assemblies 18 to stow proprotors 22 in the folded position during non-rotary, airplane flight mode. FIGS. 3-7 illustrate operation of an exemplary active clamp system 46.

Figure 2:
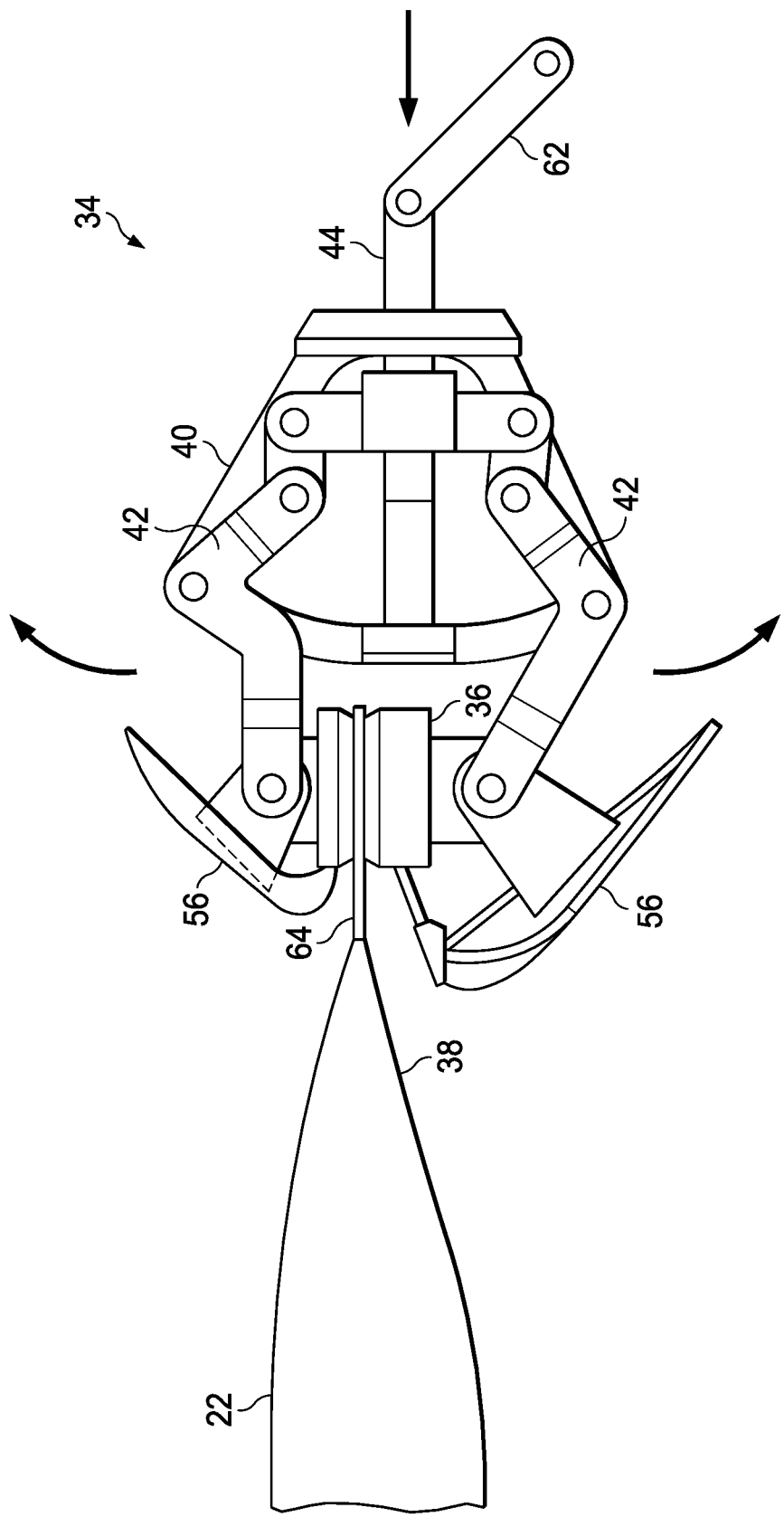
FIG. 2 illustrates an exemplary proprotor clamp system according to aspects of the disclosure.
Figure 3:
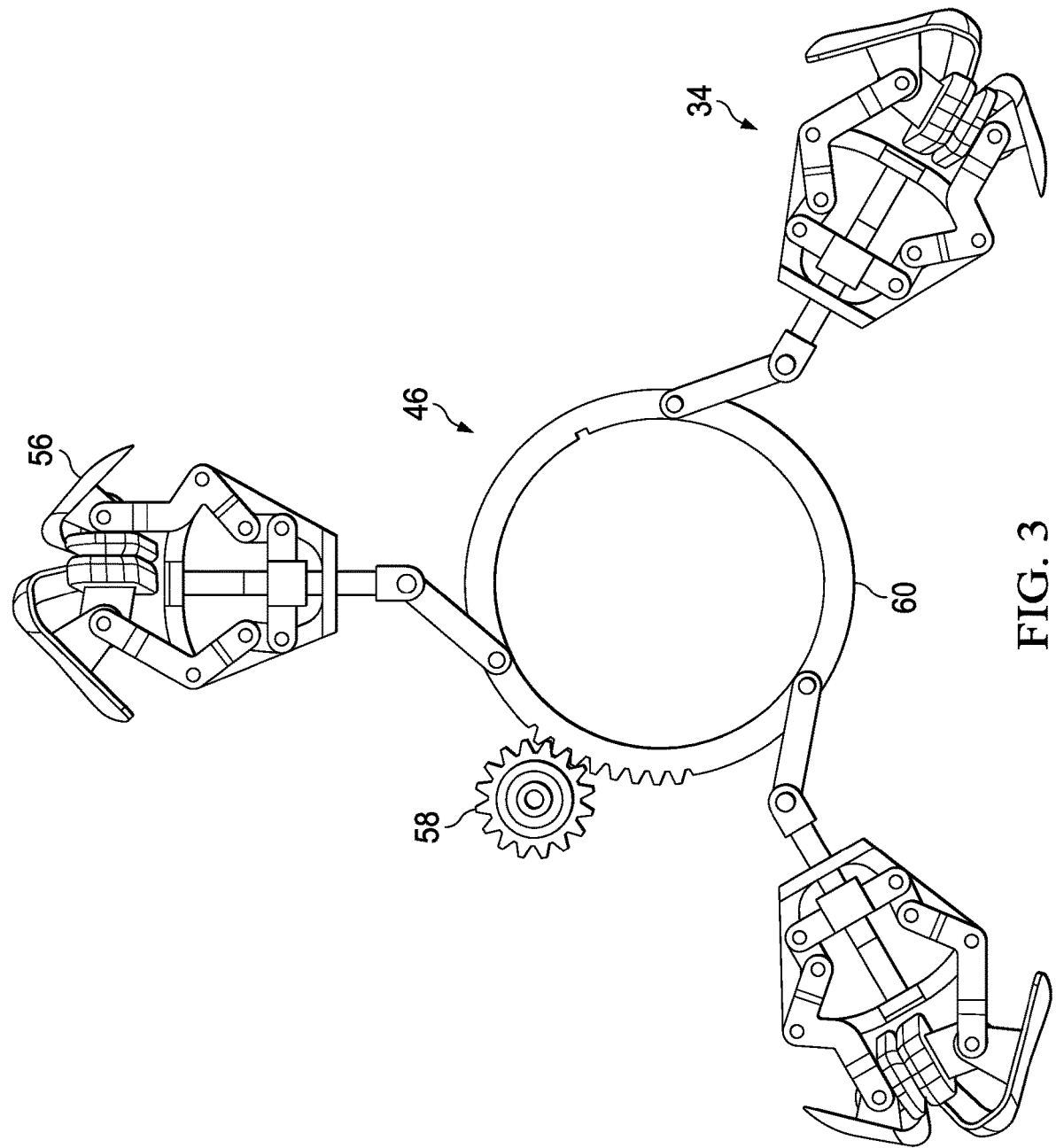
FIG. 3 illustrates an exemplary proprotor clamp according to aspects of the disclosure.

Each clamp 34 includes a pair of opposing compliant pads 36 that are operable between an open position and a closed position. FIG. 2 illustrates an exemplary clamp 34 closed on a portion of a proprotor blade 22 to grip and secure proprotor blade 22 in a stowed position. In the closed position clamps 34 grip proprotor blade 22 on or proximate to a trailing edge 38. Each pad 36 is pivotally connected to a frame 40 by a rocker arm 42. An axial rod 44 is coupled to rocker arms 42 such that movement of axial rod 44 in a first axial direction moves pads 36 away from each other opening clamp 34 and movement of axial rod in a second axial direction moves pads together thereby closing clamp 34.

The illustrated exemplary active clamp system 46 includes one clamp 34 for each proprotor blade 22. Active clamp system 46 is mounted inside of a pylon fairing 48 of pylon assembly 18. Clamps 34 are mounted on a support 50 positioning clamps 34 circumferentially around pylon 54 proximate the outer mold line (OML) 52. Each of clamps 34 is positioned at a cut-out 54 (FIG. 5) in pylon fairing 48.

Figure 4:
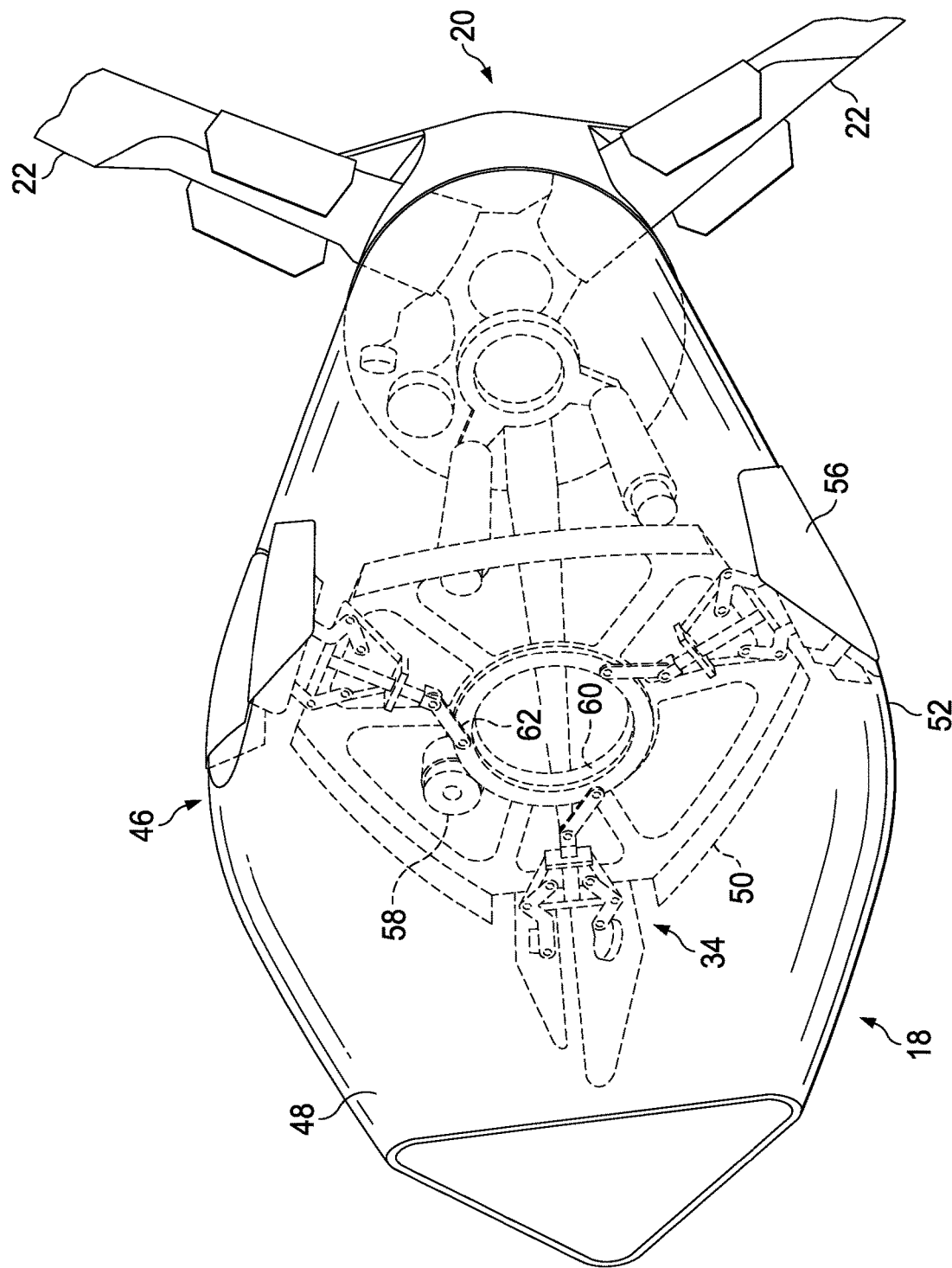
FIG. 4 illustrates a proprotor assembly in a rotary flight mode with exemplary active proprotor clamps in a closed position according to aspects of the disclosure.

In an exemplary embodiment, clamp 34 includes cover or shield members 56 mounted outboard of each compliant pad 36. Cover members 56 are positioned for example flush with OML 52 to close cut-outs 54 when clamps 34 are closed. For example, FIG. 4 illustrates clamps 34 closed and cover members 56 substantially covering or closing cut-outs 54 when proprotor blades are extended and the aircraft is in rotary flight mode. Cover members 56 may be contoured to match the contour of OML 52 at cut-outs 54 and positioned outboard or inboard of pylon fairing 48 to be substantially flush with OML 52. In some embodiments, cover member 56 may be an extended portion of pad 36 that is contoured to substantially close cut-out 54 when clamp 34 is closed. It will be recognized by those skilled in the art with benefit of this disclosure that clamp 34 may not include cover member 56.

In an exemplary embodiment, active clamp system 46 uses a single rotary actuator 58 to simultaneously actuate clamps 34 between open and closed positions. Rotary actuator 58 and clamps 34 are operationally connected through a rotary transmission 60 and links 62. Each clamp 34 is coupled to rotary transmission 60 by a respective link 62. The connection of link 62 with clamp 34 may be configured such that when clamp 34 is in the closed position, link 62 is overcenter locking clamp 34 in the closed position. Opening clamp 34 requires operating actuator 58 to move link 62 from overcenter.

FIG. 4 illustrates proprotor assembly 20 in the rotary flight mode. In the rotary flight mode, blades 22 are extended generally perpendicular to pylon fairing 48. Clamps 34 are in the closed position such that cover members 56 close the cut-outs in pylon fairing 48 to reduce drag. Link 62 is shown overcenter relative to the axial rod of clamp 34 thereby locking clamp 34 in the closed position.

Figure 5:
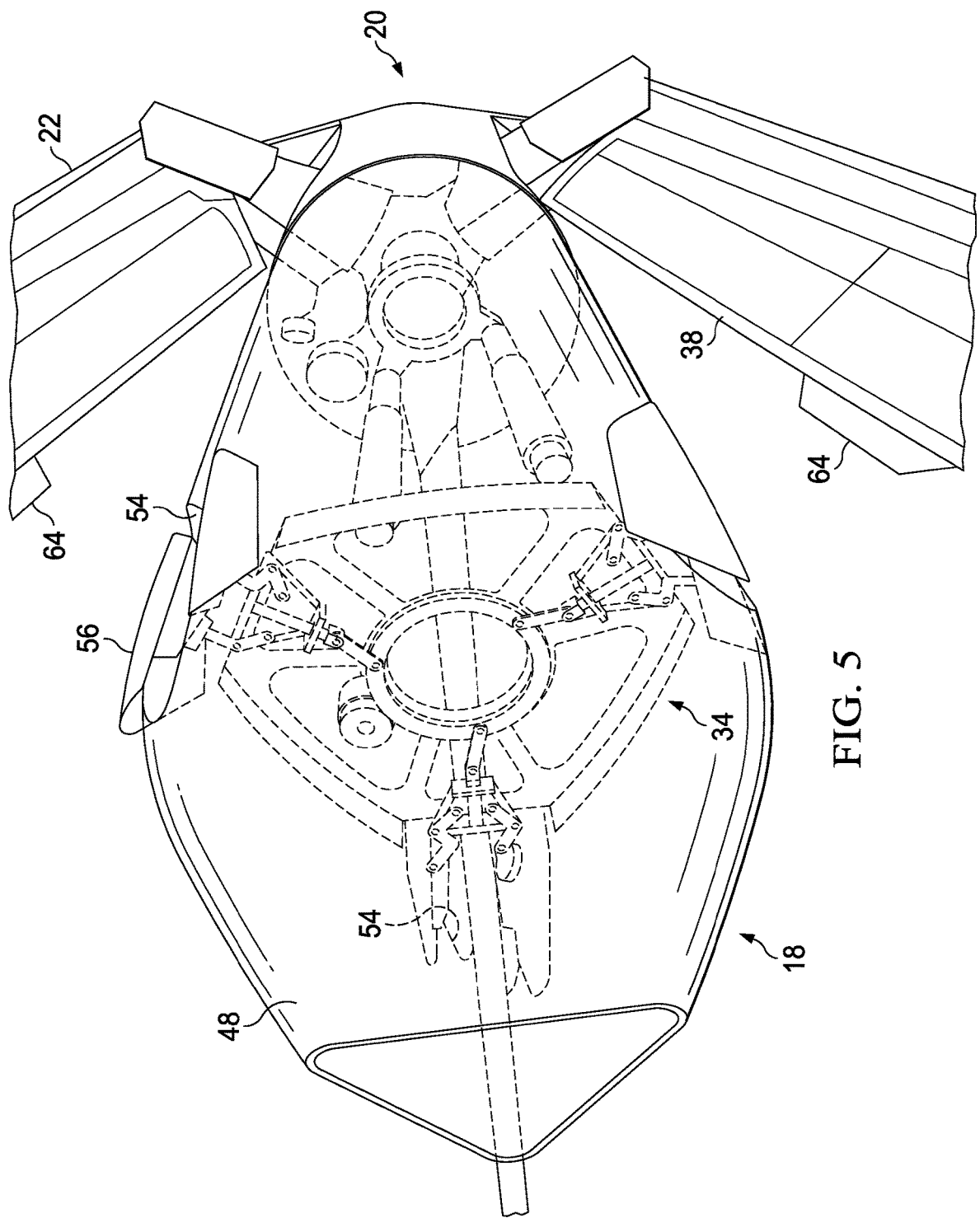
FIG. 5 illustrates a proprotor assembly in a non-rotary flight mode with the proprotor blades partially folded back and the exemplary active clamps in an open position according to aspects of the disclosure.

FIG. 5 illustrates proprotor assembly 20 in a non-rotary flight mode with proprotor blades 22 partially folded back toward pylon assembly 18. Rotary actuator 58 has been operated to actuate clamps 34 from the closed position to the open position. In the open position, cover members 56 of each clamp 34 are separated opening cut-out 54 so that a portion of proprotor blade 22 can be positioned in or at cut-out 54 between compliant pads 36 (FIG. 5). In the example of FIG. 5, trailing edge 38 includes a trailing edge tab 64 that extends aft of blade trailing edge 38 for disposing through cut-out 54 to be gripped by clamp 34.

Proprotor blades 22 are constructed of a very thin outer skin enclosing an inner honeycomb matrix and are very easily damaged. Trailing edge 38 is the thin edge where the opposite sides of the outer layer are bonded. Trailing edge tab 64 is constructed of carbon fiber material, similar to the outer skin, and provides an increased surface area to be gripped by clamp 34.

Figure 6:
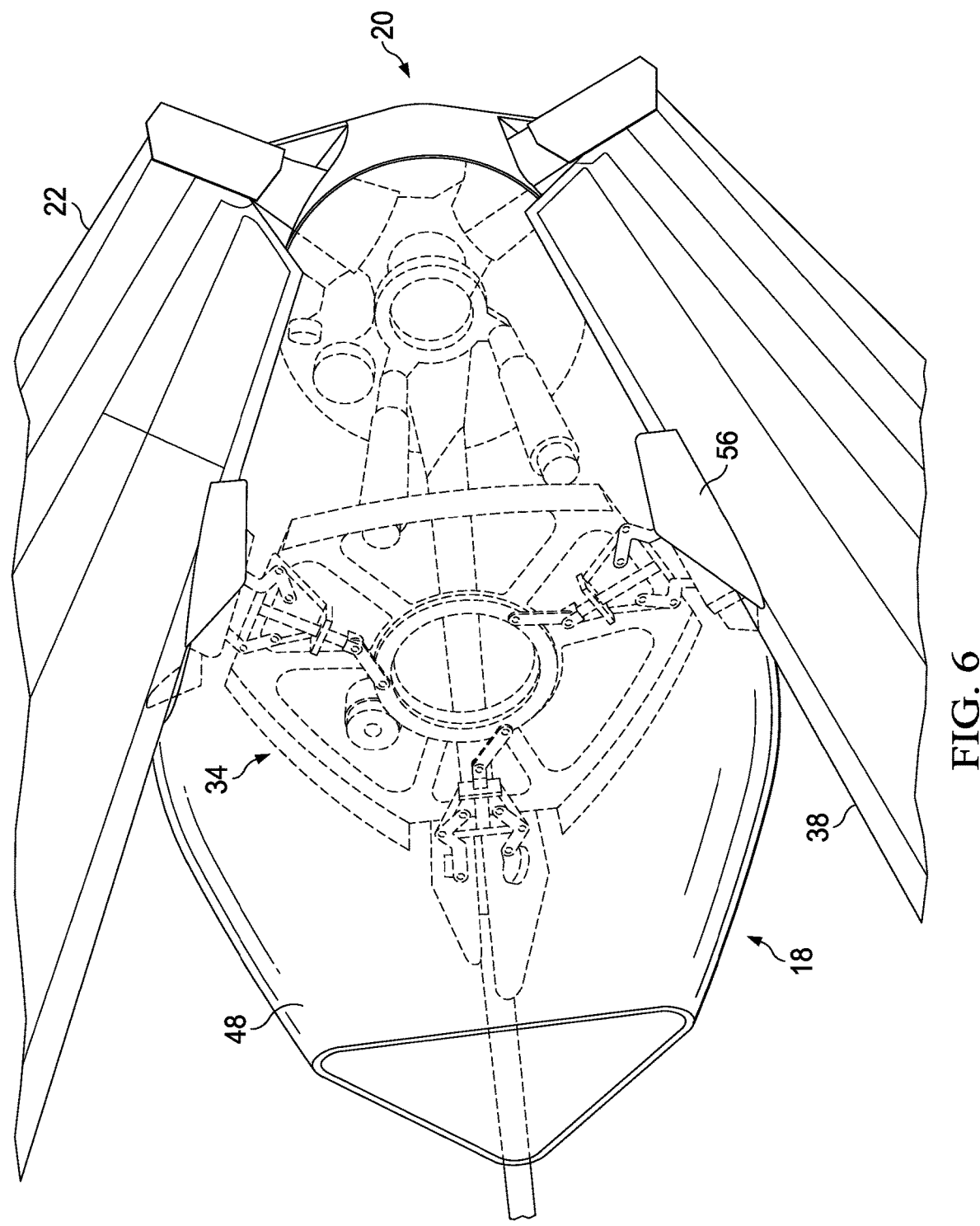
FIG. 6 illustrates a proprotor assembly in a non-rotary flight mode with the proprotor blades fully folded back and gripped and secured in a stowed position by the exemplary active clamps.

FIG. 6 illustrates proprotor assembly 20 in a non-rotary flight mode with proprotor blades 22 fully folded back an in the stowed position. A portion of trailing edge 38, e.g. trailing edge tab 64 (FIG. 5), is positioned in and gripped by clamp 34. Clamp 34 is in the closed position such that clamp 34 grips proprotor blade 22 and cover members 56 substantially close cut-out 54 (FIG. 5) in pylon fairing 48.

Figure 7:
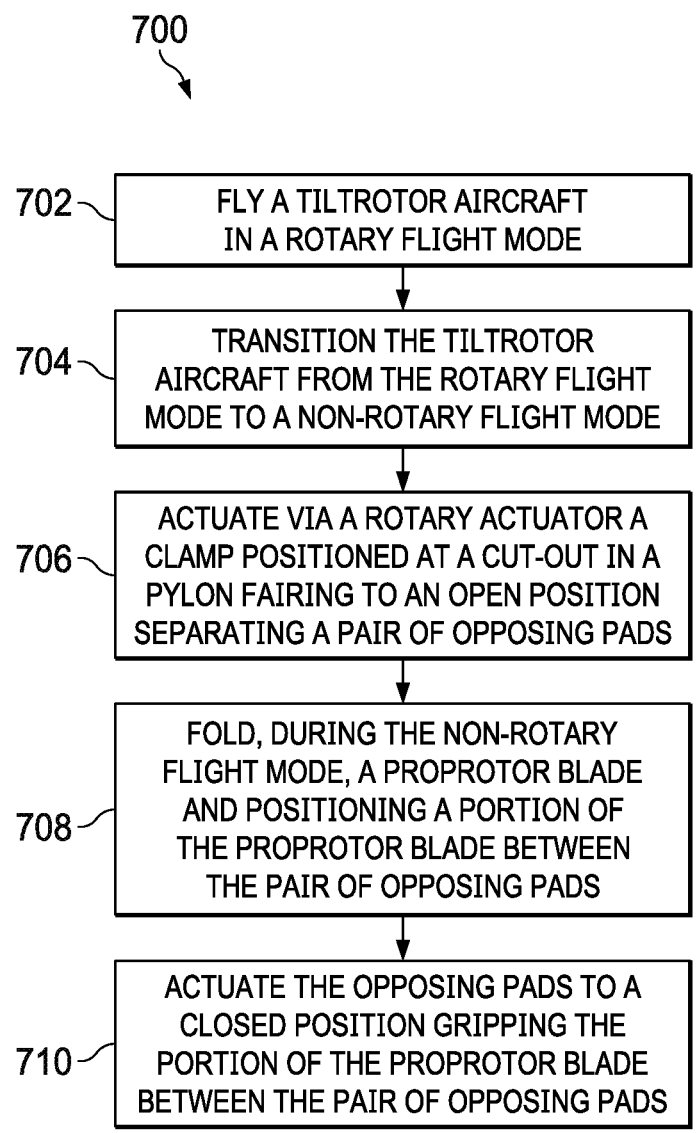
FIG. 7 illustrates an exemplary method of operating a stowed blade active restraint during flight of a tiltrotor aircraft.

FIG. 7 is a block diagram illustrating an exemplary method 700 of operating a stowed blade active restraint. At block 702, tiltrotor aircraft 10 is flown in a rotary flight mode. As described above, clamp 34 may be in a closed position with shield members 56 substantially closing the cut-out in the pylon fairing during rotary flight. At block 704, tiltrotor aircraft 10 is transitioned from the rotary flight mode to a non-rotary flight mode. At block 706, clamp 34 is actuated to an open position separating the pair of pads 36. In embodiments having shield members 56, opening clamp 34 opens fairing cut-out 54. At block 708, while in the non-rotary flight mode, proprotor blade 22 is folded positioning a portion of the proprotor blade between the opposing pads of the open clamp. The portion of the proprotor blade positioned between the opposing pads may be a trailing edge tab 64 extending from trailing edge 38. At block 710, clamp 34 is actuated to the closed position gripping the portion of proprotor blade 22 between the pair of opposing pads 36. In embodiments having shield members 56, shield members 56 substantially close cut-out 54 in pylon fairing 48.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A clamp system for securing a proprotor blade in a stowed position, the clamp system comprising:
a clamp comprising a pair of opposing pads operable between an open position to receive a portion of a proprotor blade between the pair of opposing pads and a closed position to grip the portion of the proprotor blade with the pair of opposing pads;
a single rotary actuator in connection with the clamp, wherein the single rotary actuator is configured to operate the clamp between the open and the closed position;
an axial rod coupled to the pair of opposing pads, wherein a first pad of the pair of opposing pads is coupled to the axial rod via a first rocker arm and a second pad of the pair of opposing pads is coupled to the axial rod via a second rocker arm; and
wherein axial movement of the axial rod in a first axial direction moves the first pad and the second pad away from one another and the axial movement of the axial rod in a second axial direction moves the first pad and the second pad towards one another.

2. The clamp system of claim 1, wherein the single rotary actuator is connected to the pair of opposing pads through an overcenter link, wherein the overcenter link locks the pair of opposing pads in the closed position.

3. The clamp system of claim 1, wherein the clamp comprises a frame; and
the pair of opposing pads pivotably connected to the frame.

4. The clamp system of claim 3, wherein the single rotary actuator is connected to the axial rod through an overcenter link, wherein the overcenter link locks the pair of opposing pads in the closed position.

5. The clamp system of claim 4, further comprising a rotary transmission connecting the overcenter link to the single rotary actuator.

6. The clamp system of claim 1, wherein the portion of the proprotor blade comprise a tab extending from a trailing edge of the proprotor blade.

7. The clamp system of claim 6, wherein the single rotary actuator is connected to the pair of opposing pads through an overcenter link, wherein the overcenter link locks the pair of opposing pads in the closed position.

8. The clamp system of claim 7, wherein the clamp comprises a frame;
the pair of opposing pads pivotably connected to the frame; and
the axial rod coupled to the pair of opposing pads and the overcenter link, wherein axial movement of the axial rod moves the pair of opposing pads relative to one another.

9. An aircraft comprising:
a pylon rotatable relative to a wing, the pylon having a fairing with a cut-out;
a proprotor assembly carried by the pylon, the proprotor assembly having a proprotor blade that is foldable to a stowed position during non-rotary flight;
a clamp positioned with the pylon at the cut-out, the clamp comprising a pair of opposing pads operable between an open position to receive a portion of the proprotor blade between the pair of opposing pads and a closed position to grip the portion of the proprotor blade with the pair of opposing pads;
a single rotary actuator in connection with the clamp to operate the clamp between the open and the closed position;
an axial rod coupled to the pair of opposing pads, wherein a first pad of the pair of opposing pads is coupled to the axial rod via a first rocker arm and a second pad of the pair of opposing pads is coupled to the axial rod via a second rocker arm; and
wherein axial movement of the axial rod in a first axial direction moves the first pad and the second pad away from one another and the axial movement of the axial rod in a second axial direction moves the first pad and the second pad towards one another.

10. The aircraft of claim 9, wherein the single rotary actuator is connected to the pair of opposing pads through an overcenter link, wherein the overcenter link locks the pair of opposing pads in the closed position.

11. The aircraft of claim 9, wherein the clamp further comprises shield members that substantially close the cut-out when the clamp is in the closed position.

12. The aircraft of claim 11, wherein the single rotary actuator is connected to the pair of opposing pads through an overcenter link, wherein the overcenter link locks the pair of opposing pads in the closed position.

13. The aircraft of claim 9, wherein the portion of the proprotor blade comprises a tab extending from a trailing edge of the proprotor blade.

14. The aircraft of claim 9, wherein the clamp comprises a frame; and
the pair of opposing pads pivotably connected to the frame.

15. The aircraft of claim 14, the clamp further comprises shield members that substantially close the cut-out when the clamp is in the closed position.

16. The aircraft of claim 15, wherein the portion of the proprotor blade comprises a tab extending from a trailing edge of the proprotor blade.

17. A method comprising:
flying a tiltrotor aircraft in a rotary flight mode;
transitioning the tiltrotor aircraft from the rotary flight mode to a non-rotary flight mode;
coupling an axial rod to a pair of opposing pads, wherein a first pad of the pair of opposing pads is coupled to the axial rod via a first rocker arm and a second pad of the pair of opposing pads is coupled to the axial rod via a second rocker arm;
actuating via a single rotary actuator a clamp positioned at a cut-out in a pylon fairing to an open position separating the pair of opposing pads;
folding, during the non-rotary flight mode, a proprotor blade and positioning a portion of the proprotor blade between the pair of opposing pads;
actuating the pair of opposing pads to a closed position gripping the portion of the proprotor blade between the pair of opposing pads; and
wherein axial movement of the axial rod in a first axial direction moves the first pad and the second pad away from one another and the axial movement of the axial rod in a second axial direction moves the first pad and the second pad to the closed position.

18. The method of claim 17, wherein the clamp further comprises shield members, the shield members substantially closing the cut-out when the clamp is in the closed position.

19. The method of claim 17, wherein the portion of the proprotor blade comprises a tab extending from a trailing edge of the proprotor blade.

20. The method of claim 19, wherein the clamp further comprises shield members, the shield members substantially closing the cut-out when the clamp is in the closed position.

* * * * *